UNITED STATES PATENT OFFICE.

DANIEL M. LAMB, OF NEW YORK, N. Y.

WATERPROOFING COMPOUND.

SPECIFICATION forming part of Reissued Letters Patent No. 9,776, dated June 21. 1881.

Original No. 224,295, dated February 10, 1880. Application for reissue filed July 13, 1880.

*To all whom it may concern:*

Be it known that I, DANIEL M. LAMB, of the city, county, and State of New York, have made a new and useful Improvement in a Compound for Treating Goods to Render them Water-Proof; and I hereby declare the subjoined specification to be a full and clear description thereof.

The object of this invention is to provide a compound or substance for treating textile fabrics of any kind, such as silks, linens, cottons, woolens, &c., or furs, skins, paper, wood, stone, metal, leather, &c., or, in fact, goods of any description that may be found desirable, so that said material shall be adapted to enter into all the fibers or pores of the articles treated, and render each fiber essentially water-proof, or capable of repelling or shedding off water thrown upon or placed in contact with it; and the materials used for this purpose are to be so compounded and manipulated that the goods, when treated therewith, shall retain all their ordinary beauty and style of finish, remain as entirely pliable and soft as in the natural state, be as perfectly inodorous as before the treatment, and that the delicacy of shade or color possessed by the goods will not in the slightest degree be injured or changed by the treatment hereinafter more particularly specified, but, on the contrary, all colors will become more fixed and permanent and less liable to fade.

The materials used for this purpose, the manner of compounding them, and the process of treating the goods, are as follows:

In the first place, I take solidified and refined paraffine and dissolve it in any of the lighter hydrocarbons, such as naphtha, benzine, benzole, gasoline, &c.; but I take only such hydrocarbons as are 70° Beaumé gravity or over, using for this mixture, say, from one-quarter of an ounce to two ounces or more (practically, for ordinary cases, about one ounce) of the paraffine to one gallon of the solvent. The proportions in which these ingredients are mixed will vary, of course, with the kind and quality of the goods to which the mixture is to be applied and the purposes for which the goods are to be employed.

The mixture may be made in any suitable quantities, and will preferably be compounded in such a vessel as is usually employed as and called an "agitator" in coal-oil-refining operations.

To facilitate the solution of the paraffine it should be cut up into small pieces before it is submerged in the solvent, and the mixture should be allowed to stand until the paraffine is fully dissolved, and then there are to be added to the mixture above four pounds (more or less) of chloride of sodium or common salt to each forty gallons of the mixture, and then about four pounds (more or less) of sulphuric acid to the said mixture. The mixture thus compounded should be allowed to stand undisturbed in the agitator for about twenty-four hours, during which time the chloride of sodium, being distributed over the bottom of the vessel or agitator, will be attacked by sulphuric acid, and the resultant gas thus formed at the bottom of the vessel will rise and permeate through the compound under treatment. By this part of the process the mucilaginous and sedimentary portions of the compound are precipitated and the igniting-point is raised, as well as its specific gravity considerably increased. After the mixture shall have stood undisturbed in the mixing-vessel for twenty-four hours, or thereabout, it will be agitated by an injected current or currents of air driven into the compound by some suitable air compressor or blower, the discharging end or ends of the air pipe or pipes being submerged in the liquid, so as to allow the air to permeate the whole mass under treatment. After this gaseous treatment of the compound shall have been completed, the sediment will be drawn off or removed from the agitator, and the remainder will be thoroughly washed with clean water, using for this purpose, say, from five to ten gallons of water to one barrel of the compound. The agitation or blowing of air through the mixture will be continued until substantially all of the gas shall have been driven out of the mass. The washing is accompanied with a small mixture of caustic soda or ammonia, or both, so as to absorb or neutralize any unpleasant odors, as well as to wash out of the mixture any foreign substance or remaining portion of the gas.

The agitation of the mixture will, in most cases, require from one to four hours, and after it shall have been completed the mixture will be allowed to stand quiet long enough (about one hour, more or less) for the water, acid, and sediment to settle to the bottom of the vessel, when the waterpoofing compound will be completed and stand in the top part of the vessel, which should then be tightly closed, or the mixture drawn off into a closed vessed, so as to prevent evaporation, and it will then be ready for use for the purpose for which it is intended.

The foregoing treatment of the dissolved paraffine, while it is held in solution by means of the above-described gas, will be such as to change the mass, so that it will not decompose, as would a mere mechanical mixture, at 32° Fahrenheit, and will not do so at 0 Fahrenheit, or even below that point, the precise degree being as yet undetermined. Neither is the precise chemical form of the compound yet determined with accuracy, but it is perfectly, or nearly perfectly, colorless, and is odorless, the bleaching effect produced by the gas formed by the mixture of chloride of sodium and sulphuric acid being of the most perfect character.

A process similar in part has heretofore been applied by me to the treatment of crude oils, said process being described in a patent granted me in 1876, No. 183,401, in which such oils are described as treated with gas and agitated with air.

The process by which goods are to be treated with this compound is as follows: A suitable bath or shallow vessel with a removable self-sealing cover is to be provided, which is to be filled or partly filled with the waterproofing liquid prepared as above described. The goods to be treated are then to be immersed in this bath for a sufficient length of time to thoroughly saturate them, and for this purpose the time will vary with the thickness, kind, and quality of the goods under treatment. Thus, for fine, thin, or delicate goods, such as thin silk, laces, kid gloves, &c., a half hour would in most cases be sufficient, while for thick fabrics, cloths, leather, &c., one hour may be required, and for furs, wood, stone, metal, and other articles, a longer time would be required, varying with the material under treatment, but which expert operators would soon determine for themselves. After the bath shall have been completed the goods are to be taken out of it and all adhering moisture shaken or brushed off, and then hung up to dry in a closed apartment or drying-room and dried by steam-heat, keeping the temperature of the drying-room at, say, from 85° to 100° Fahrenheit. After the drying the goods may be placed away in packages suitable for delivery.

Goods treated in this way will retain their water-proof or water-repelling qualities for an indefinite period of time, which will only terminate with the destruction or wearing out of the goods, and the durability of the goods so treated will be greatly increased and the colors maintained, as there can be no fading or incipient decay as long as moisture is excluded. Goods treated in this manner cannot mildew, and kid gloves thus prepared may be kept in stock indefinitely without injury.

Having described my invention, I claim—

1. The improved process for preparing a waterproofing compound for textile fabrics, dress-goods, and the like, consisting in first dissolving refined paraffine in naphtha, benzine, benzole, gasoline, or other similar hydrocarbons, and then treating the solution with gas from a mixture of chloride of sodium and sulphuric acid, as set forth.

2. The improved waterproofing compound consisting of refined paraffine dissolved in a light hydrocarbon and treated with a gas formed by the action of sulphuric acid on chloride of sodium, substantially as described.

DANIEL M. LAMB.

Witnesses:
J. B. THURSTON,
CHAS. T. HOWELL.